United States Patent
Maemura

(10) Patent No.: US 11,588,952 B2
(45) Date of Patent: Feb. 21, 2023

(54) FACSIMILE DEVICE REJECTING FACSIMILE BASED ON TRANSMISSION SOURCE LIST

(71) Applicant: Koichiro Maemura, Kanagawa (JP)

(72) Inventor: Koichiro Maemura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/452,797

(22) Filed: Oct. 29, 2021

(65) Prior Publication Data

US 2022/0141348 A1 May 5, 2022

(30) Foreign Application Priority Data

Nov. 5, 2020 (JP) .............................. JP2020-185260

(51) Int. Cl.
 *H04N 1/327* (2006.01)
 *H04N 1/32* (2006.01)
 *H04N 1/00* (2006.01)

(52) U.S. Cl.
 CPC ..... *H04N 1/32745* (2013.01); *H04N 1/00334* (2013.01); *H04N 1/00363* (2013.01); *H04N 1/3201* (2013.01)

(58) Field of Classification Search
 None
 See application file for complete search history.

(56) References Cited

U.S. PATENT DOCUMENTS

| | | | | |
|---|---|---|---|---|
| 6,239,881 | B1* | 5/2001 | Shaffer | H04N 1/32702 379/100.06 |
| 7,715,059 | B2* | 5/2010 | Advocate | H04N 1/32026 358/448 |
| 9,727,745 | B2* | 8/2017 | Park | H04N 1/00875 |
| 2003/0072032 | A1 | 4/2003 | Maemura | |
| 2006/0053137 | A1* | 3/2006 | Tanimoto | G06F 16/381 707/E17.096 |
| 2007/0279700 | A1* | 12/2007 | Sakata | H04N 1/3201 358/1.15 |
| 2009/0161141 | A1* | 6/2009 | Shobu | H04N 1/32128 358/1.14 |
| 2015/0244849 | A1* | 8/2015 | Joao | H04M 1/663 455/415 |
| 2016/0277603 | A1 | 9/2016 | Aoki et al. | |

FOREIGN PATENT DOCUMENTS

| | | |
|---|---|---|
| JP | 2002-190904 | 7/2002 |
| JP | 2014121056 A * | 6/2014 |
| JP | 2015-138991 | 7/2015 |

OTHER PUBLICATIONS

JP-2014121056-A English Translation, Figs 8-10 (Year: 2014).*

* cited by examiner

*Primary Examiner* — Miya J Williams
(74) *Attorney, Agent, or Firm* — IPUSA, PLLC

(57) ABSTRACT

An electronic device includes circuitry to determine whether to reject or accept a facsimile being transmitted from a transmission source based on a common transmission source list. The common transmission source list is shared by a plurality of electronic devices including the electronic device. The circuitry further outputs a part of the facsimile in response to determining that the transmission source is one from which the facsimile is to be rejected, based on the common transmission source list.

11 Claims, 14 Drawing Sheets

FIG. 7

| | PRESENCE OF ID OF TRANSMISSION SOURCE IN EACH LIST | RECEIVE AND/OR PRINT | IMAGE CODE ADDITION |
|---|---|---|---|
| 1 | PRESENT IN RECEPTION REJECTION LIST IN DEVICE | CANCEL IMMEDIATELY | NONE |
| 2 | PRESENT ONLY IN COMMON RECEPTION REJECTION LIST | RECEIVE AND PRINT ONLY FIRST PAGE | IMAGE CODE (A) |
| 3 | NOT PRESENT IN ANY LIST | RECEIVE AND PRINT ALL PAGES | IMAGE CODE (B) |
| 4 | PRESENT IN RECEPTION PERMISSION LIST IN DEVICE | RECEIVE AND PRINT ALL PAGES | NONE |

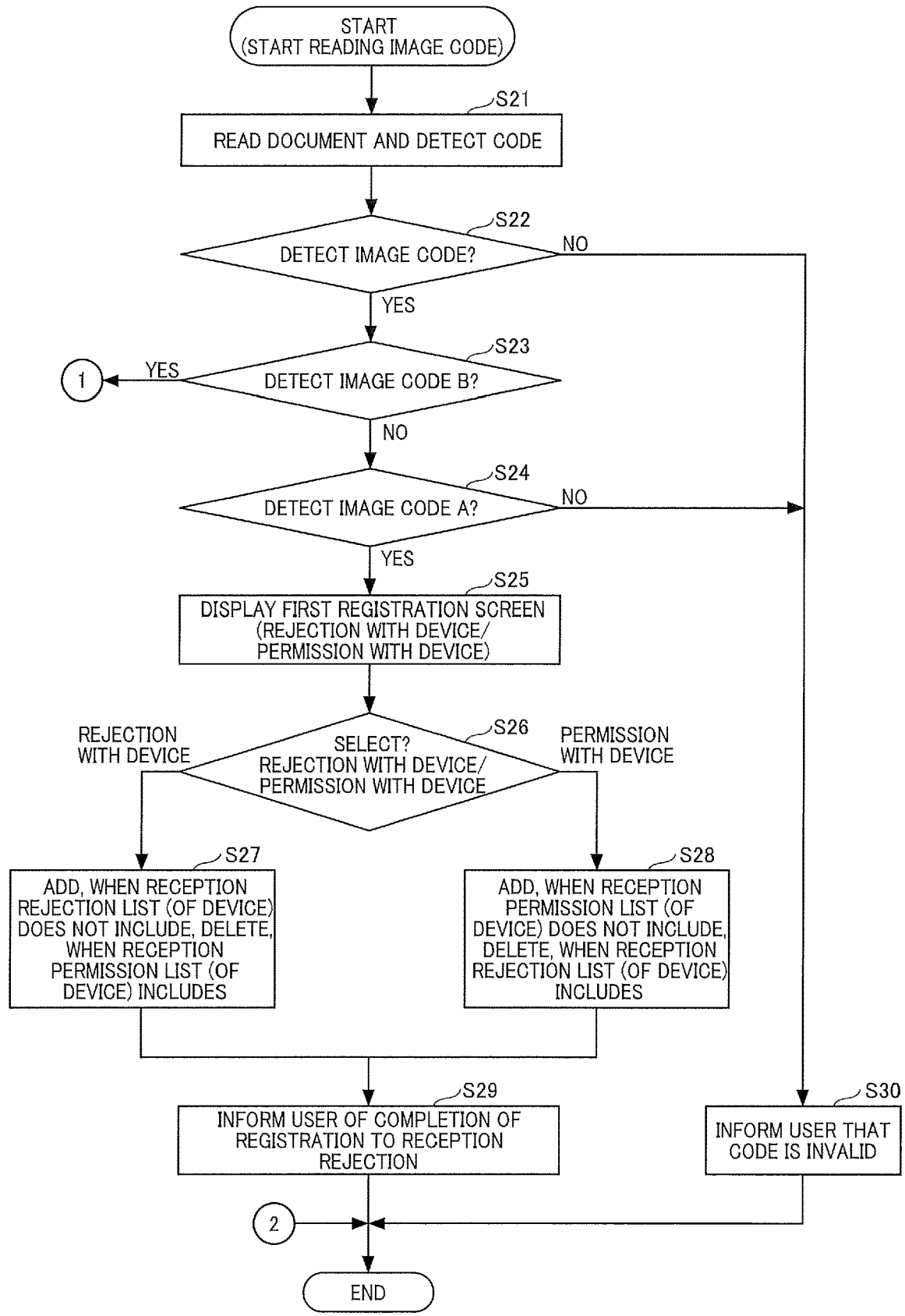

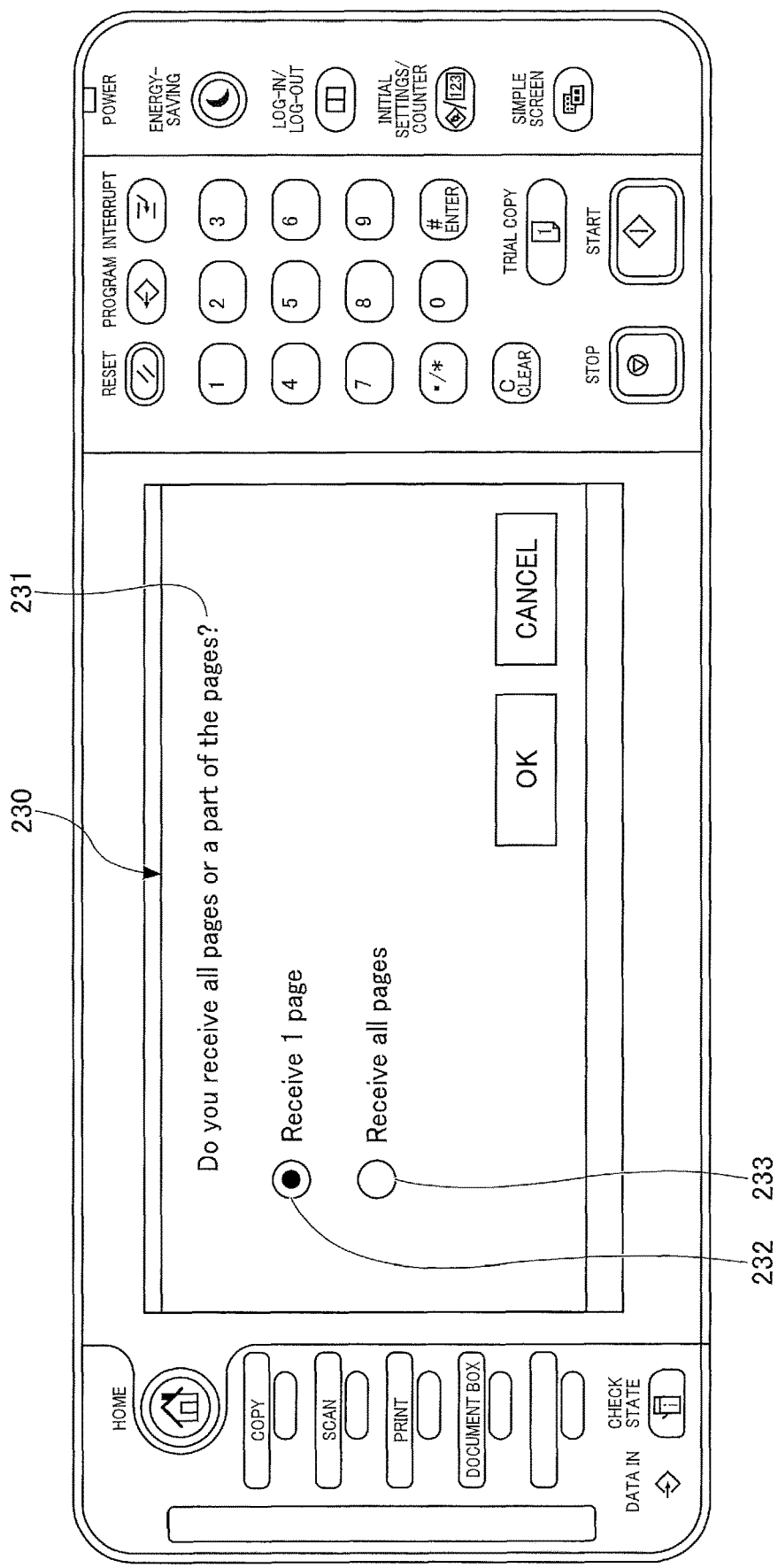

under the US 11,588,952 B2

FACSIMILE DEVICE REJECTING FACSIMILE BASED ON TRANSMISSION SOURCE LIST

CROSS-REFERENCE TO RELATED APPLICATION

This patent application is based on and claims priority pursuant to 35 U.S.C. § 119(a) to Japanese Patent Application No. 2020-185260, filed on Nov. 5, 2020, in the Japan Patent Office, the entire disclosure of which is hereby incorporated by reference.

BACKGROUND

Technical Field

Embodiments of the present disclosure relate to an electronic device, a facsimile communication system, a facsimile receiving method, and a non-transitory recording medium.

Related Art

Electronic devices such as facsimile devices are used not only for transmitting or receiving documents used in business but also for transmitting or receiving advertisements or the like. Such an electronic device may print out a printed matter that is not useful to a user. Such facsimiles that are not useful for the user are referred to as unsolicited facsimiles. Printing the unsolicited facsimiles causes waste of paper and color materials. To cope with this, techniques for reducing the unsolicited facsimiles have been devised.

There is a known technique for reducing unsolicited facsimiles by using a telephone directory (contact list of a telephone). In such a conventional technique, a facsimile device discards facsimile data transmitted from a transmission source that is registered in a common reception rejection list shared by a plurality of facsimile devices, but not registered in a contact list of the facsimile device.

SUMMARY

An embodiment of the present disclosure includes an electronic device including circuitry to determine whether to reject or accept a facsimile being transmitted from a transmission source based on a common transmission source list. The common transmission source list is shared by a plurality of electronic devices including the electronic device. The circuitry further outputs a part of the facsimile in response to determining that the transmission source is one from which the facsimile is to be rejected, based on the common transmission source list.

An embodiment of the present disclosure includes a non-transitory recording medium storing a plurality of instructions which, when executed by one or more processors, causes the processors to perform a method. The method includes outputting a part of a facsimile being transmitted from a transmission source in response to determining that the transmission source is one from which the facsimile is to be rejected based on a common transmission source list. The common transmission source list being shared by a plurality of electronic devices.

An embodiment of the present disclosure includes a facsimile receiving method. The method includes outputting a part of a facsimile being transmitted from a transmission source in response to determining that the transmission source is one from which the facsimile is to be rejected based on a common transmission source list. The common transmission source list being shared by a plurality of electronic devices.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7 is a table in which the process performed by the electronic device and illustrated in FIG. 6 is arranged, according to the one of the embodiments of the disclosure;

FIG. 10A and FIG. 10B (FIG. 10) are flowchart illustrating an example of a process in which the electronic device reads an image code and registers identification information of a transmission source in a reception permission list, a reception rejection list, or a common reception rejection list, according to the one of the embodiments of the disclosure;

FIG. 13 is a diagram illustrating an example of a setting screen for setting partial reception or full page reception, according the one of the embodiments of the disclosure.

Figure 1:
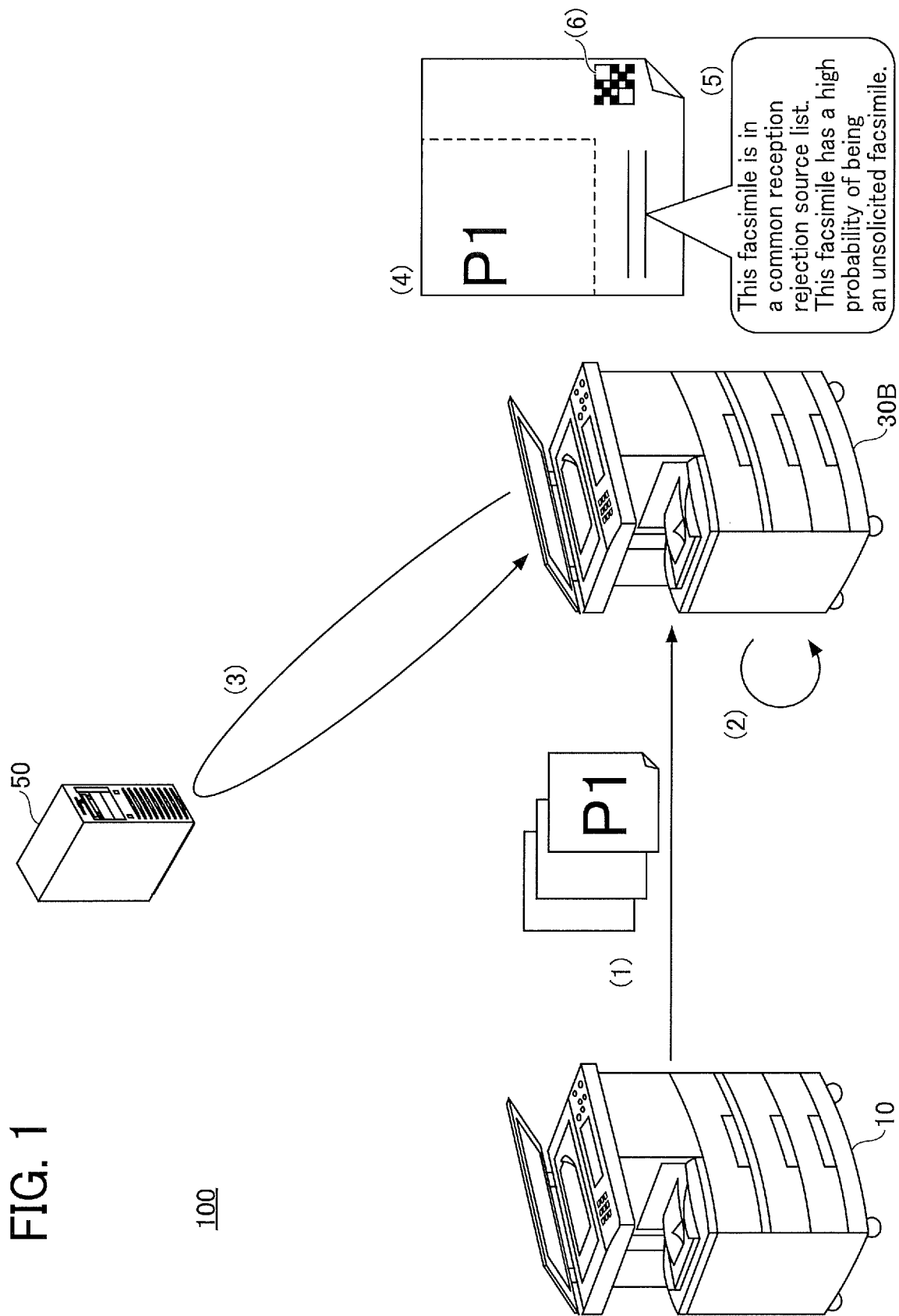
FIG. 1 is a diagram illustrating an overview of an operation of a facsimile communication system according to one of the embodiments of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present disclosure. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of a facsimile communication system and a reception method performed by the facsimile communication system according to one of the embodiments.

Overview of Operation of Facsimile Communication System:

FIG. 1 is a diagram illustrating an overview of an operation of a facsimile communication system 100 according to one of the embodiments.

(1) A facsimile device (facsimile apparatus) 10 that is a transmission source transmits a facsimile to another facsimile device (facsimile apparatus) 30B that is a transmission destination (destination).

(2) The facsimile device 30B, which is the destination, receives facsimiles from all transmission sources that are registered in a reception permission list sored in the device, which is the facsimile device 30B (reception permission list of the facsimile device 30B). The facsimile device 30B, which is the destination, does not receive any facsimiles transmitted from transmission sources that are registered in a reception rejection list stored in the device, which is the facsimile device 30B (reception rejection list of the facsimile device 30B).

(3) When the transmission source (facsimile device 10) is not registered in either the reception permission list or the reception rejection list of the device (facsimile device 30B), the facsimile device 30B, which is the destination, determines whether the transmission source (facsimile device 10) is registered in a common reception rejection list on a shared server 50.

(4) When the transmission source (facsimile device 10) is registered in the common reception rejection list on the shared server 50, the facsimile device 30B receives and prints a part of pages, but not all pages (for example, one or more pages among from all of the pages). For example, in FIG. 1, the facsimile device 30B prints the first page of three pages. The facsimile device 30B, which is the destination, may receive all pages and print a part of the pages, or may receive a part of the pages and print the part of the pages.

(5) When printing received data on the first page, the facsimile device 30B, which is the destination, also prints, in a space or a margin on the first page, a message indicating that the facsimile is from a common reception rejection transmission source and the facsimile has a high probability of being an unsolicited fax, for example. An example of message may be "This facsimile is in a common reception rejection source list. This facsimile has a high probability of being an unsolicited facsimile."

That is, the facsimile device 30B, which is the destination, does not unconditionally discard the facsimiles from a transmission source registered in the common reception rejection list, but presents, to a user along with a part of the received data, the message indicating that there is a probability that the facsimile is an unsolicited facsimile, because being registered in the common reception rejection list.

In this way, the facsimile device 30B easily informs the user of that the facsimile has is highly likely an unsolicited facsimile to be rejected. In addition, the user can check the part of the received data. This allows the user to determine whether the transmission source is really one to be rejected. Further, an advantage that the transmission source of the unsolicited facsimile is shared in a specific group such as a company is maintained.

(6) When printing the received data on the first page, the facsimile device 30B, which is the destination, also prints an image code such as a QR CODE (registered trademark) in a space or a margin on the first page, for example. The image code includes information for displaying a button (registration button) on the facsimile device 30B. The registration button is a button for registering the transmission source and a facsimile number of the transmission source in the reception permission list or the reception rejection list. When the user operates the facsimile device 30B to scan the received data, the facsimile device 30B displays the button for registering the transmission source in the reception permission list or the reception rejection list. This allows the user to register the transmission source in the reception permission list or the reception rejection list of the facsimile device 30B.

The user registers the transmission source in the reception rejection list when the user desires to reject the facsimiles from the transmission source, or registers the transmission source in the reception permission list when the user desires to receive the facsimiles from the transmission source.

Regarding Terms:

The facsimile is a communication method in which a still image such as a character, a figure, or a photograph is decomposed into fine pixels, converted into an electric signal and transmitted the electric signal to a transmission destination, and the transmission destination reproduces the electric signal as a still image. The facsimile includes a public network facsimile, an Internet fax, and an Internet Protocol-FAX (IP-FAX), depending on a transmission line or communication control.

The common transmission source list is information on a list of transmission sources shared by a plurality of electronic devices on a server. The common transmission source list includes a list in which transmission sources in relation to the reception rejection are registered and a list in which transmission sources in relation to reception permission are registered. In the description of the present embodiment, the list in which the transmission sources in relation to the reception rejection are registered is used as the common transmission source list.

Outputting a part of the facsimile means outputting M pages out of N pages that is the number of total pages (N>M). M is one or more pages. The electronic device may output any page, and may output, for example, the first page. In addition, the electronic device may not output all of a single page, may output a part of the single page (for example, several rows from the top).

The identification information (ID) of the transmission source is identification information identifying the transmission source of the facsimile. The identification information of the transmission source is information used for determining whether the electronic device rejects or permits reception of the facsimile. A detailed description of this is described later.

Figure 2:
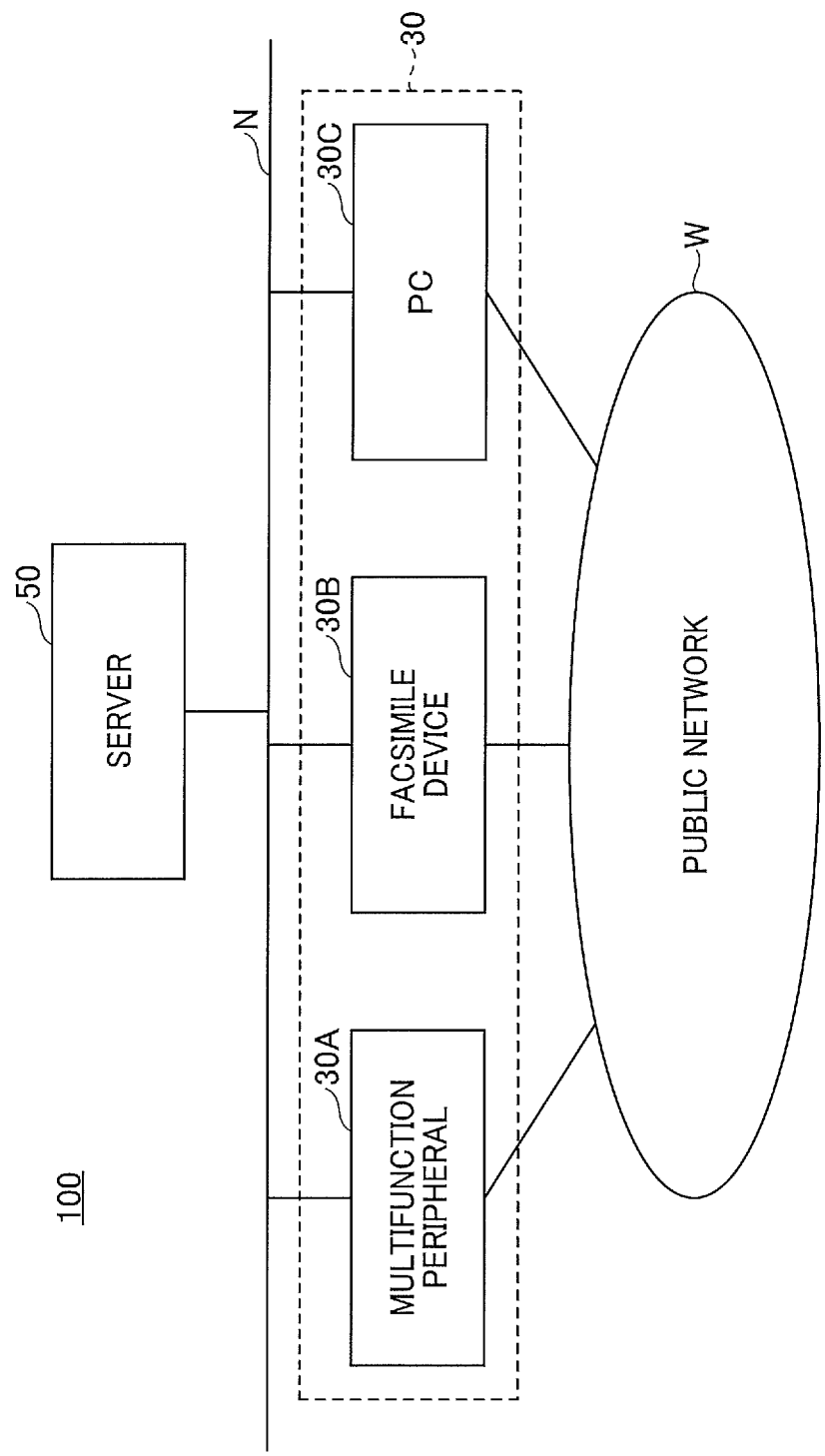
FIG. 2 is a block diagram illustrating an example of an overall configuration of the facsimile communication system according to the one of the embodiments of the disclosure.

Example of System Configuration:

FIG. 2 is a block diagram illustrating an example of an overall configuration of the facsimile communication system 100. The facsimile communication system 100 includes a multifunction peripheral 30A, a facsimile device 30B, and a Personal Computer 30C (PC) that are communicably connected to each other via a public network W. Each of the multifunction peripheral 30A, the facsimile device 30B, and the PC 30C is an electronic device 30 that receives a facsimile. Each of the multifunction peripheral 30A, the facsimile device 30B, and the PC 30C may have a function of transmitting a facsimile. Hereinafter, each of the multifunction peripheral 30A, the facsimile device 30B, and the PC 30C is referred to as the electronic device 30 without distinguishing among the multifunction peripheral 30A, the facsimile device 30B, and the PC 30C.

The public network W is a telephone line through which the facsimile device 10, which is the transmission source of image data (facsimile document), and the electronic device 30, which receives the image data (facsimile document) exclusively use to transmit the image data (facsimile document). The electronic devices 30, which is a transmission source or a transmission destination, is specified by a facsimile number.

In addition to use of the public network W, the electronic device 30 may use the Internet or the IP-FAX in order to transmit or receive a facsimile. A method of transmitting or receiving a facsimile via the Internet by attaching a file to an e-mail is referred to as an Internet fax. Accordingly, in the Internet fax, the transmission source transmits image data using an e-mail mechanism, and the electronic device 30, which is the transmission destination, receives the image data using the e-mail mechanism. Each of the transmission source and the transmission destination is specified by mail address.

The IP-FAX also uses the Internet, which is same as the Internet fax, but the IP-FAX uses protocols such as Session Initiation Protocol (SIP) and H. 323 for communication connection. The SIP is a protocol for establishing, changing, or disconnecting a session in order to exchange audio, video, or text messages between two or more locations. H. 323 is a protocol for call control in telephones. H. 323 performs processing such as establishing and disconnecting a communication path between a transmission source and a transmission destination on networks. T. 37 may be used as a protocol.

Since the IP-FAX uses the Internet, a transmission destination and a transmission source are specified by Session Initial Protocol (SIP) Uniform Resource Identifier (URI). In SIP, various URIs may be specified, and an IP address, a host name, an SIP user name, or a facsimile number may be an SIP URI, for example. These are described in the header of a Real-time Transport Protocol (RTP) packet of the SIP.

The Internet fax or the IP-FAX does not use the public network W, which is advantageous in terms of communication cost. Since messages are transmitted via the Internet in the internet fax or the IP-FAX, to encrypt a message is recommended when the message includes important information.

The multifunction peripheral 30A is an electronic device 30 that has functions including at least a facsimile receiving function. The multifunction peripheral 30A has, for example, a printer function and a scanner function. The printer function allows the multifunction peripheral 30A to print the received facsimile. The scanner function allows the multifunction peripheral 30A to read the printed facsimile by a scanner. The multifunction peripheral 30A may be referred to as a Multi-function Peripheral/Product/Printer (MFP). In addition, the multifunction peripheral 30A may be referred to as an image forming apparatus (device), an image processing apparatus (device), a printer, a print apparatus (device), a scanner, or a facsimile apparatus (device).

The facsimile device 30B is an electronic device 30 that has a facsimile receiving function. The facsimile device 30B has a function of printing a received facsimile and a function of reading a document to be transmitted by a scanner.

The PC 30C is an information processing device on which an Operating System (OS) such as WINDOWS (registered trademark) is installed. Since the PC 30C is connectable to the Internet, Internet fax and IP-FAX are available with the PC 30C. In order for the PC 30C to transmit or receive a facsimile via the public network W, a device such as a facsimile modem is additionally used. The PC 30C includes a tablet terminal, a smartphone, a Personal Digital Assistant (PDA), a game machine, a car navigation system, an electronic whiteboard, and a video conference terminal.

As illustrated in FIG. 2, the facsimile communication system 100 includes a shared server 50 connected to a network N. Each of the multifunction peripheral 30A, facsimile device 30B and the PC 30 is connected to the network N. In the present embodiment, since the multifunction peripheral 30A, the facsimile device 30B, and the PC 30C share the common reception rejection list, each of the multifunction peripheral 30A, the facsimile device 30B, and the PC 30C is assumed to be the electronic device 30 used in or belongs to the same company or organization. Accordingly, the network N may be an in-house Local Area Network (LAN), a wide-area LAN providing connection between offices, a Wide Area Network (WAN), a Virtual Private Network (VPN), or the Internet, for example.

The shared server 50 is one or more information processing devices. The shared server 50 according to the present embodiment is mainly used as a storage location of the common reception rejection list. Accordingly, the shared server 50 may be simply a Network Attached Storage (NAS) on the network.

The server is a computer or software having a function of providing information or a processing result in response to a request from a client. The shared server 50 may be on the Internet or may be on-premises. When being on the Internet, the shared server 50 may support cloud computing. The cloud is a term used when a specific hardware resource is not intended.

Figure 3:
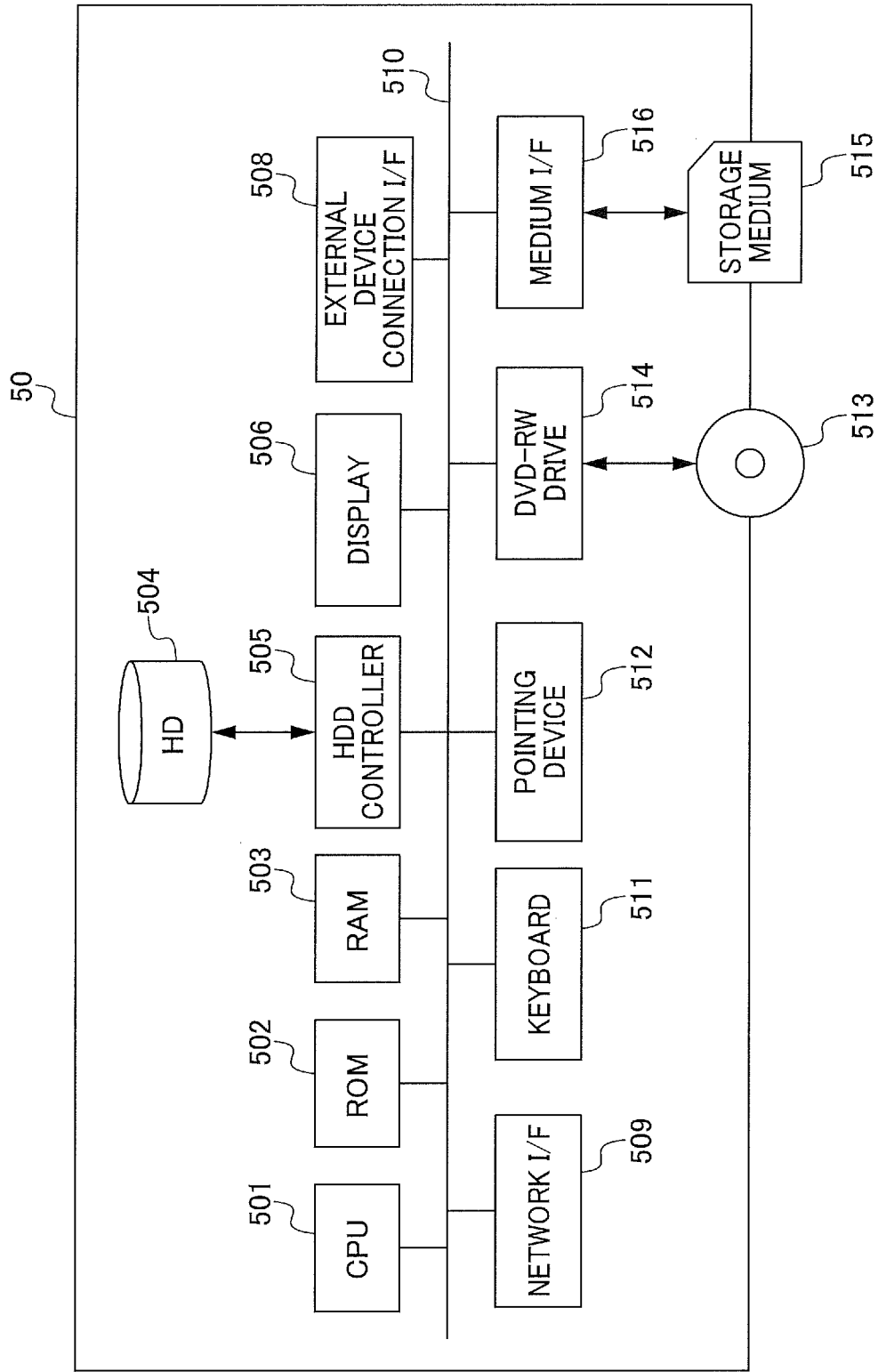
FIG. 3 is a diagram illustrating an example of a hardware configuration of a shared server according to the one of the embodiments of the disclosure.

Example of Hardware Configuration:

Example of Hardware configuration of Shared Server:

FIG. 3 is a block diagram illustrating an example of a hardware configuration of the shared server 50. As illustrated in FIG. 3, the shared server 50 is implemented by a computer including a Central Processing Unit (CPU) 501, a Read Only Memory (ROM) 502, a Random Access Memory (RAM) 503, a Hard Disk (HD) 504, a Hard Disk Drive (HDD) controller 505, a display 506, an external device connection interface (I/F) 508, network I/F 509, a bus line 510, a keyboard 511, a pointing device 512, a Digital Versatile Disc Rewritable (DVD-RW) drive 514 and a medium I/F 516.

The CPU 501 performs overall control of the shared server 50. The ROM 502 stores a program such as an Initial Program Loader (IPL) used for driving the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, a character, or an image. The external device connection I/F 508 is an interface for connecting to various external devices. The external device in this case is, for example, a Universal Serial Bus (USB) memory or a printer. The network I/F 509 is an interface for performing data communication using the network N. The bus line 510 is an address bus, a data bus, or the like for electrically connecting the components such as the CPU 501 illustrated in FIG. 3 each other.

The keyboard 511 is an example of an input device provided with a plurality of keys used to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The DVD-RW is not limited to the DVD-RW, and the DVD-R or the like may be used as the DVD-RW 513. The medium I/F 516 controls the storage medium 515 such as a flash memory that reads or writes (stores) data.

The PC 30C has the same or substantially the same hardware configuration as that of FIG. 3. Even if the PC 30C has a different hardware configuration, a description of the present embodiment is given under the assumption that such differences are insignificant.

Figure 4:
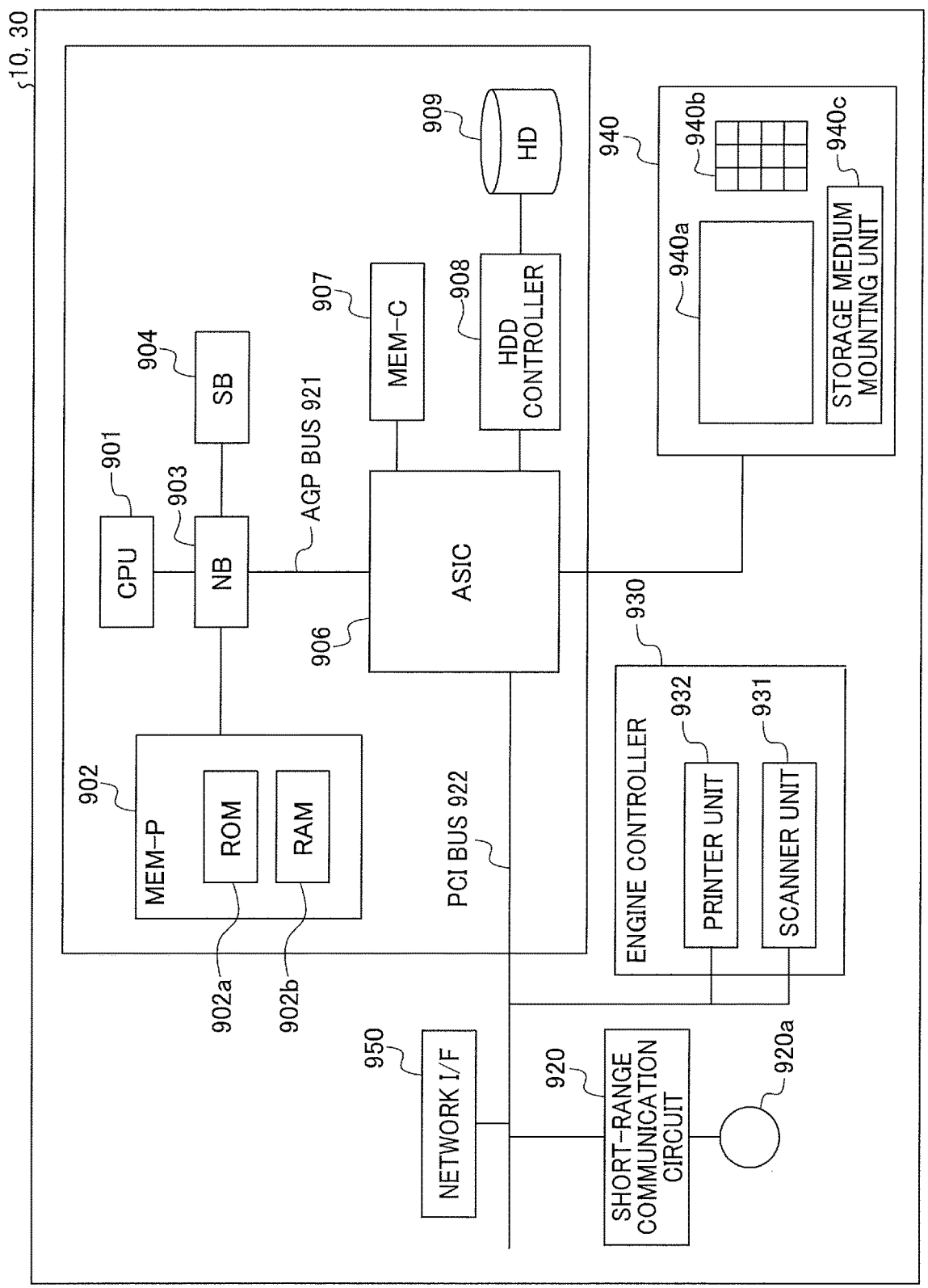
FIG. 4 is a block diagram illustrating an example of a hardware configuration of one of a multifunction peripheral and a facsimile device according to the one of the embodiments of the disclosure.

Example of Hardware Configuration of Multifunction Peripheral and Facsimile Device:

FIG. 4 is a block diagram illustrating an example of a hardware configuration of each of the multifunction peripheral 30A and the facsimile device 30B according to the present embodiment. As illustrated in FIG. 4, each of the multifunction peripheral 30A and the facsimile device 30B includes a controller 910, a short-range communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, an HDD controller 908, and an HD 909 as a storage unit. The NB 903 and the ASIC 906 are connected through an Accelerated Graphics Port (AGP) bus 921.

The CPU 901 is a control unit that performs overall control of the multifunction peripheral 30A or the facsimile device 30B. The NB 903 connects the CPU 901 with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for implementing various functions of the controller 910. The MEM-P 902 further includes a RAM 902b as a memory that deploys the program and data, or as a drawing memory that stores drawing data for printing. The program stored in the RAM 902b may be stored in any computer-readable storage (recording) medium, such as a compact disc-read only memory (CD-ROM), compact disc-recordable (CD-R), or digital versatile disc (DVD), in a file format installable or executable by the computer, for distribution.

The SB 904 connects the NB 903 with a PCI device or a peripheral device. The ASIC 906 is an integrated circuit (IC) dedicated to an image processing use, and connects the AGP bus 921, a PCI bus 922, the HDD controller 908, and the MEM-C 907. The ASIC 906 includes a PCI target, an AGP master, an arbiter (ARB) as a central processor of the ASIC 906, a memory controller for controlling the MEM-C 907, a plurality of direct memory access controllers (DMACs) capable of converting coordinates of image data with a hardware logic, and a PCI unit that transfers data between a scanner unit 931 and a printer unit 932 through the PCI bus 922. The ASIC 906 may be connected to a USB interface, or the Institute of Electrical and Electronics Engineers 1394 (IEEE1394) interface.

The MEM-C 907 is a local memory used as a buffer for image data to be copied or a code buffer. The HD 909 stores various image data, font data for printing, and form data. The HDD controller 908 reads and writes various data from and to the HD 909 under control of the CPU 901. The AGP bus 921 is a bus interface for a graphics accelerator card, which has been proposed to accelerate graphics processing. Through directly accessing the MEM-P 902 by high-throughput, speed of the graphics accelerator card is improved.

The short-range communication circuit 920 includes a short-range communication antenna 920a. The short-range communication circuit 920 is a communication circuit that communicates in compliance with the near field communication (NFC), the Bluetooth (registered trademark) and the like.

The engine controller 930 includes the scanner unit 931 and the printer unit 932. Further, the control panel 940 displays the current set value, a selection screen, and the like. The control panel 940 includes a display panel 940a implemented by, for example, a touch panel that receives a user input and an operation panel 940b including a numeric keypad that receives set values of various image forming parameters such as image density parameter and a start key that accepts an instruction for starting copying. The control panel 940 is also provided with a storage medium mounting unit 940c for mounting a storage medium. The controller 910 performs overall control of the multifunction peripheral 30A or the facsimile device 30B. For example, the controller 910 controls drawing, communication, or user inputs to the control panel 940. The scanner unit 931 and the printer unit 932 each performs various image processing, such as error diffusion or gamma conversion.

In response to an instruction to select a specific application through the control panel 940, for example, using a mode switch key, the multifunction peripheral 30A or the facsimile device 30B selectively performs a document box function, a copy function, a print function, and a facsimile function. The multifunction peripheral 30A or the facsimile device 30B enters a document box mode when the document box function is selected, a copy mode when the copy function is selected, a printer mode when the printer function is selected, and a facsimile mode when the facsimile mode is selected.

The network I/F 950 is an interface for performing data communication using the network N. The short-range communication circuit 920 and the network I/F 950 are electrically connected to the ASIC 906 through the PCI bus 922.

Figure 5:
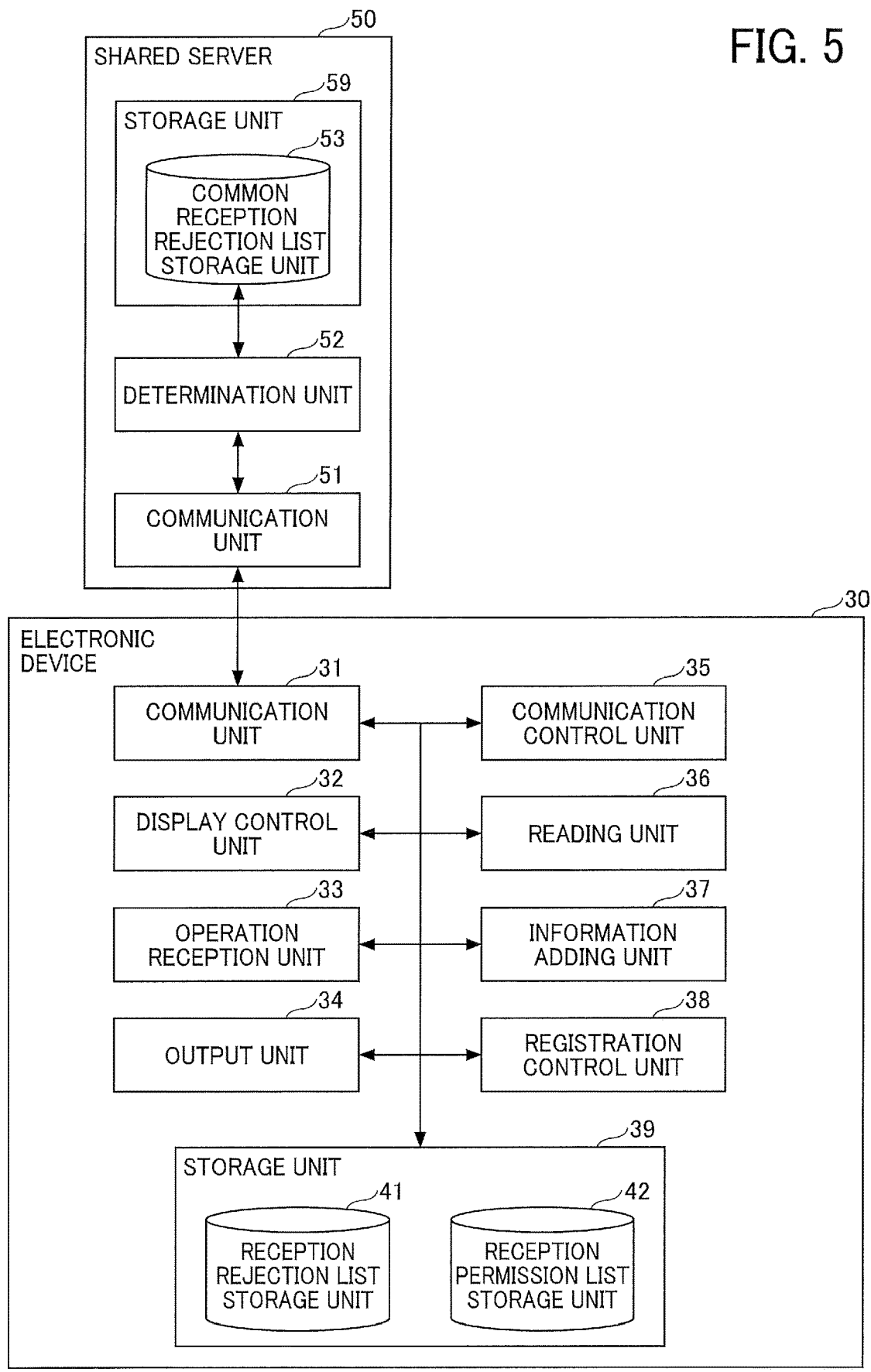
FIG. 5 is a block diagram illustrating a functional configuration of an electronic device according to the one of the embodiments of the disclosure.

Functions:
Electronic Device:

FIG. 5 is a block diagram illustrating an example of a functional configuration of the electronic device 30 according to the present embodiment. The electronic device 30 includes a communication unit 31, a display control unit 32, an operation reception unit 33, an output unit 34, a communication control unit 35, a reading unit 36, an information adding unit 37, and a registration control unit 38. These functions of the electronic device 30 are functions or units implemented by the CPU 901 of the multifunction peripheral 30A or the facsimile device 30B illustrated in FIG. 4 executing a program stored in the HD 909 or the like and controlling the hardware of the multifunction peripheral 30A or the facsimile device 30B. In addition, these functions of the electronic device 30 are functions or units implemented by the CPU 501 of the PC 30 illustrated in FIG. 3 executing a program stored in the HD 504 or the like and controlling the hardware of the PC 30.

The communication unit 31 communicates with the shared server 50 via the network N. In the present embodiment, the communication unit 31 specifies identification information of the transmission source and inquires whether the transmission source is registered in the common reception rejection list. The communication unit 31 receives the presence or absence of registration.

The display control unit 32 displays a screen serving as a user interface on the control panel 940. In addition, the display control unit 32 displays a registration button used by the user to register the identification information of the transmission source in each list. The display control unit 32 also displays the stored facsimiles and the history of transmission and reception. In addition, the display control unit 32 displays a menu related to printing, transfer, and deletion of a facsimile, for example.

The operation reception unit 33 receives a user operation performed with respect to the electronic device 30. For example, the operation reception unit 33 receives registration of identification information of a transmission source in each list. The operation reception unit 33 may receive a voice operation.

The output unit 34 outputs the facsimile (image data) received by the communication control unit 35 by using the printer unit 932. A method of printing may be either an electrophotographic method or an inkjet method. The output unit 34 prints all the received facsimiles and deletes them from the memory. The output unit 34 does not delete facsimiles that have been received but have not been printed. The output unit 34 may display a facsimile on the control panel 940, may store a facsimile in a file server, or may transfer a facsimile to an in-house user by e-mail.

The communication control unit 35 transmits or receives image data (facsimile document) using a facsimile communication protocol. Examples of the facsimile communication protocol include G3, super G3, and G4. For example, in G3, an analog line is used, the resolution is 200 dpi in both horizontal and vertical directions, and the compression method is Modified Huffman (MH) coding or Modified Read (MR) coding. In the super G3, a compression method is Modified Modified Read (MMR) or Joint Bi-level Image Experts Group (JBIG). In G4, an Integrated Service Digital Network (ISDN) line is used, and the resolution is 400 dpi. A communication protocol for the Internet fax includes T. 37 Simple Mode (mail method), and a communication protocol for IP-FAX includes a system such as T. 37 direct Simple Mail Transfer Protocol (SMTP) (IP address method) and T. 38 (FAX over IP (FoIP)), for example.

The communication control unit 35 acquires the identification information of the transmission source when the incoming call is received. Accordingly, the communication control unit 35 controls the reception of the facsimile according to whether the identification information of the transmission source is registered in the reception rejection list storage unit 41, the reception permission list storage unit 42, or the shared server 50. A detailed description of this is described later.

The reading unit 36 optically reads a sheet member and generates image data. If an image code is formed on the sheet member, the reading unit 36 also reads the image code. The reading unit 36 decodes the image code. As will be described later, the image code includes identification information of the transmission source and a type of the image code.

An information adding unit 37 adds a message and an image code to the facsimile according to whether the transmission source of the facsimile is registered in the common reception rejection list or not. An output unit 34 prints the facsimile to which the message and the image code are added.

The registration control unit 38 performs processing related to registration of the identification information of the transmission source. That is, the registration processing of the identification information of the transmission source is started according to the type of the image code decoded by the reading unit 36. When the user inputs a registration operation, the registration control unit 38 registers the identification information of the transmission source in the list selected by the user.

The electronic device 30 further includes a storage unit 39 implemented by the HD 909, ROM 902a, RAM 902b, or the like illustrated in FIG. 4. The storage unit 39 includes a reception rejection list storage unit 41 and a reception permission list storage unit 42 (see Tables 1 and 2).

TABLE 1

Reception Rejection List

| Number | Transmission Source ID |
| --- | --- |
| 1 | 03-XXXX-1234 |
| 2 | 03-1234-XXXX |
| 3 | a@sample.com |
| 4 | 102.28.34.101 |

Table 1 is an example of the reception rejection list stored in the reception rejection list storage unit 41. The reception rejection list is a list of transmission sources from which the electronic device 30 rejects receiving, or accepting, facsimiles. As illustrated in Table 1, a facsimile number, a mail address, or a SIP URI (IP address in Table 1) is registered as identification information of a transmission source.

TABLE 2

Reception Permission List

| Number | Transmission Source ID |
| --- | --- |
| 1 | 03-XXXX-6789 |
| 2 | 03-6789-XXXX |
| 3 | z@sample.com |
| 4 | 135.79.24.68 |

Table 2 is an example of the reception permission list stored in the reception permission list storage unit 42. The reception permission list is a list of transmission sources to which the electronic device 30 permits receiving, or accepting, facsimiles. As illustrated in Table 2, a facsimile number, a mail address, or a SIP URI (IP address in Table 2) is registered as identification information of a transmission source.

When the identification information of the same transmission source is registered in both the common reception rejection list and the reception permission list, the reception permission list is given a priority over the common reception rejection list. That is, each user receives facsimiles from a transmission source registered in the common reception rejection list by registering the identification information of the transmission source, from which the user desires to receive facsimiles, in the reception permission list.

Shared Server:

The shared server 50 includes a communication unit 51 and a determination unit 52. These functions of the shared server 50 are functions or units implemented by the CPU 501 of the shared server 50 illustrated in FIG. 3 executing a program stored in the HD 504 or the like and controlling the hardware of the shared server 50.

The communication unit 51 communicates with the electronic device 30 via the network N. In the present embodiment, the communication unit 51 receives an inquiry from the electronic device 30 as to whether identification information of a transmission source is registered in the common reception rejection list or not. The communication unit 51 transmits the presence or absence of registration to the electronic device 30.

The determination unit 52 determines whether the identification information of the transmission source received by the communication unit 51 is stored in the common reception rejection list storage unit 53, and transmits a response indicating the presence or absence of registration to the electronic device 30 via the communication unit 51.

The shared server 50 further includes a storage unit 59 implemented by the HD 504, ROM 502, RAM 503, or the like of the shared server 50 illustrated in FIG. 3. The storage unit has a common reception rejection list storage unit 53 (see Table 3).

TABLE 3

Common Reception Rejection List

| Number | Transmission Source ID |
|---|---|
| 1 | 03-XXXX-4321 |
| 2 | 03-4321-XXXX |
| 3 | b@sample.com |
| 4 | 124.68.19.12 |

Table 3 is an example of the common reception rejection list stored in the common reception rejection list storage unit 53. The common reception rejection list is an example of a common transmission source list. The common reception rejection list is a list of transmission sources. The electronic devices 30 connected via the network N commonly rejects facsimiles received from a transmission source included in the common reception rejection list. As illustrated in Table 3, a facsimile number, a mail address, or a SIP URI (IP address in Table 3) is registered as identification information of a transmission source.

For example, in a case where there is a company that frequently transmits a facsimile by Direct Mail (DM), the administrator registers the identification information of the transmission source in the common reception rejection list once to reject the reception of facsimiles with all the electronic devices 30. Accordingly, even when each user who uses the corresponding electronic device 30 does not register the identification information of the transmission source in the electronic device 30, the electronic device 30 reject the reception of the facsimiles form the transmission source corresponding to the identification information registered in the common reception rejection list.

Figure 6:
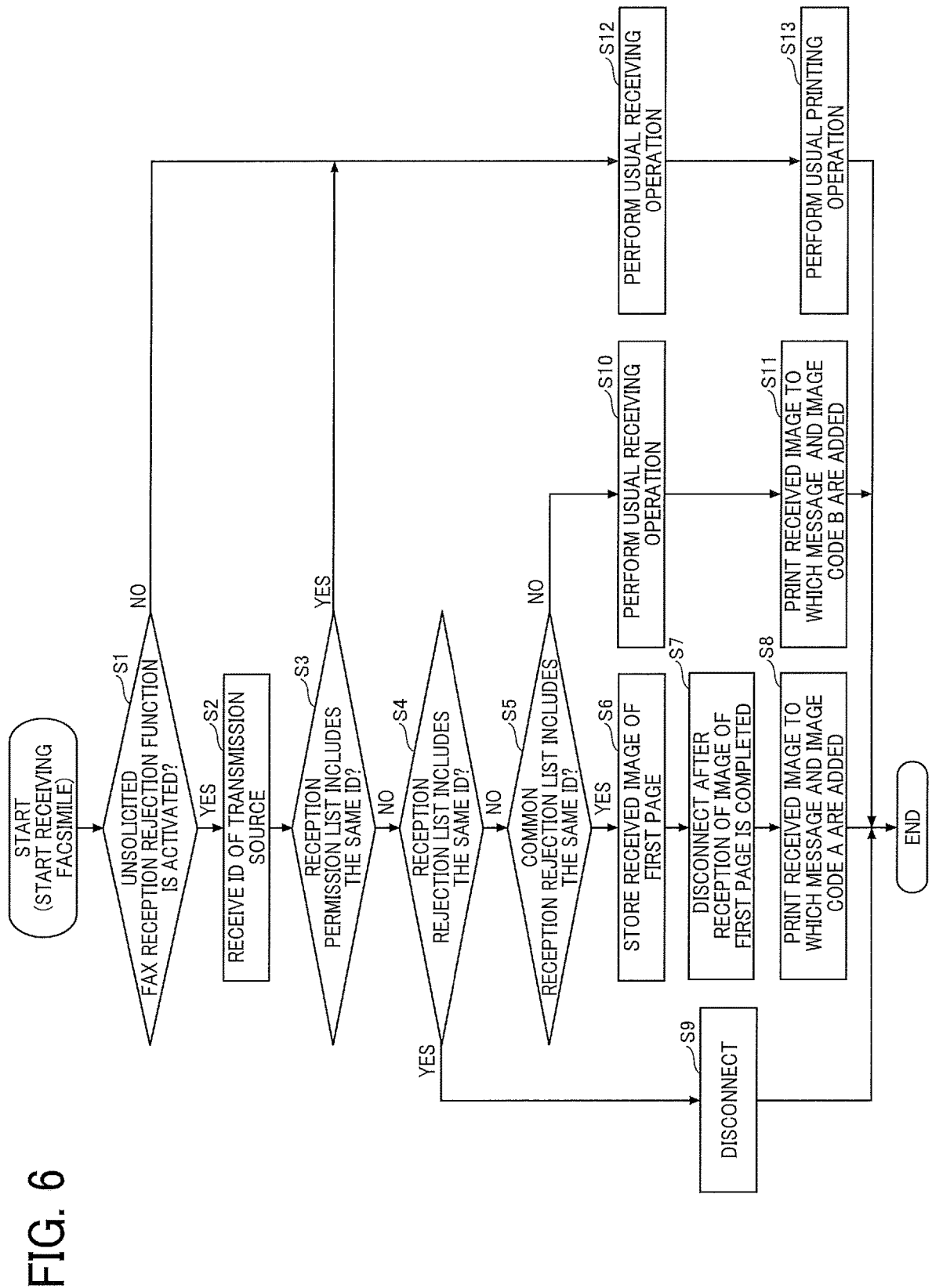
FIG. 6 is a flowchart illustrating an example of a process in which the electronic device starts receiving a facsimile, rejects reception of the facsimile, prints a part of the facsimile, or performs reception and printing of all of the facsimile according to the one of the embodiments of the disclosure.

Operation in Receiving Facsimile:

A description is given below of a process of receiving a facsimile performed by the electronic device 30, with reference to FIG. 6. FIG. 6 is a flowchart illustrating an example of a process in which the electronic device 30 starts receiving a facsimile, rejects reception of the facsimile, prints a part of the facsimile, or performs reception and printing of all of the facsimile. The process illustrated in FIG. 6 starts when the electronic device 30 detects an incoming call.

FIG. 7 is a table in which the process performed by the electronic device 30 and illustrated in FIG. 6 is arranged. As illustrated in FIG. 7, the electronic device 30 performs reception control, print control, or image code addition control according to registration of the transmission source in relation to the three lists (reception rejection list, reception permission list, and common reception rejection list).

1. When the transmission source is registered in the reception rejection list of the electronic device 30, the electronic device 30 does not receive or print any page of the facsimile.

2. When the transmission source is registered in the common reception rejection list, the electronic device 30 receives a single page of the facsimile and prints the single page. The electronic device 30 adds an image code A (an example of a first image code) to the facsimile. The electronic device 30 may receive all of the pages of the facsimile and print the single page of all of the pages.

3. When the transmission source is not registered (is unregistered) in any of the reception rejection list of the electronic device 30, the reception permission list of the electronic device 30, and the shared reception rejection list, the electronic device 30 receives all of the pages of the facsimile and prints all of the pages. The electronic device 30 adds an image code B (an example of a second image code) to the facsimile.

4. When the transmission source is registered in the reception permission list of the electronic device 30, the electronic device 30 receives all of the pages of the facsimile and prints all of the pages. Since the transmission source is already registered in the reception permission list, the electronic device 30 does not add any image code to the facsimile.

The process is described below with reference to FIG. 6. First, the communication control unit 35 determines whether the unsolicited facsimile (fax) reception rejection function is activated or not (S1). A setting of ON or OFF of the unsolicited fax reception rejection function is settable by a user via a screen of the electronic device 30 or a setting site of the server. In the description of the present embodiment, it is assumed that the unsolicited fax reception rejection function is ON (activated). When the unsolicited fax reception rejection function is OFF, the electronic device 30 receives all of the pages of the facsimile and prints all of the pages of the facsimile even when the transmission source is registered in the reception rejection list or the common reception rejection list.

The communication control unit 35 receives identification information of the transmission source (S2). When detecting the incoming call, the communication control unit transmits a signal indicating the incoming call to an exchange of the telephone company, and the exchange receives the signal and transmits information such as a telephone number (facsimile number) of the transmission source to the electronic device 30, which is one received the incoming call. In a case of Internet fax, a mail address of the transmission source is described in the header of the electronic mail, and in a case of the IP-FAX, a SIP URI of the transmission source is included in the header of the packet.

The communication control unit 35 determines whether the reception permission list in the storage unit 39 includes information that matches the identification information of the transmission source (S3).

If the determination in step S3 is YES, the communication control unit 35 receives all pages of the facsimile (S12).

The output unit 34 prints all pages of the received facsimile (S13). Regarding a transmission source recorded in a contact list of a facsimile device, a user may "desire to receive facsimiles from the transmission source even if the user does not transmit a facsimile to the transmission source," and this matter is not taken into account in a conventional technology in which control is performed based on a telephone directory (contact list of a telephone). In the present embodiment, since the electronic device 30 has the reception rejection list and the reception permission list, the electronic device 30 may receive a facsimile from a transmission source to which the electronic device 30 does not transmit a facsimile.

When the determination of step S3 is NO, the communication control unit 35 first determines whether there is information that matches the identification information of the transmission source in the reception rejection list of the storage unit 39 (S4).

When the determination of step S4 is YES, the communication control unit 35 disconnects the line (S9). The communication control unit 35 transmits, for example, a call end signal to the exchange to disconnect the line. In the case of Internet fax, the communication control unit 35 may not receive the mail from a mail server. Alternatively, the communication control unit 35 may register the transmission sources (mail addresses) of the reception rejection list of the mail server in advance. Alternatively, the communication control unit 35 receives all pages once, and then all pages may be discarded in the case of reception rejection. In a case of IP-FAX, the communication control unit 35 transmits a BYE method to the SIP server according to the SIP protocol.

When the determination of step S4 is NO, the communication control unit 35 determines whether there is information that matches the identification information of the transmission source in the common reception rejection list of the shared server 50 (S5). The communication control unit 35 transmits the identification information of the transmission source to the shared server 50 via the communication unit 31 to inquire about the presence or absence of registration.

When the determination of step S5 is YES, the communication control unit 35 receives the first page of the facsimile (S6). That is, when the determination indicates that the transmission source is one from which the reception of a facsimile is to be rejected based on the common reception rejection list, the communication control unit 35 receives the first page of the facsimile.

When the facsimile reception of the first page is completed, the communication control unit 35 disconnects the line (S7). That is, the communication control unit 35 disconnects the communication after receiving a part of the facsimile. Since the facsimile device 10, which is the transmission source, transmits "page end" every time the transmission of a single page is ended, the communication control unit 35 disconnects at a time when receiving the corresponding "page end". In the case of Internet fax, a multi-page facsimile in a Tag Image File Format-Facsimile (TIFF-F) format is stored in the mail server. The communication control unit 35 requests the mail server to transmit the first page. In this case, the mail server acquires the first page. The communication control unit 35 may notify the mail server of the reception rejection. Accordingly, the transmission source detects that the facsimile is not received by the destination transmission. When receiving the first page, the communication control unit 35 once receives all pages and then discard the subsequent pages. In the case of IP-FAX, the communication control unit 35 analyzes the RTP packet to detect a page break. Upon detecting the page break of the first page, the communication control unit 35 transmits a BYE method.

Figure 8A:
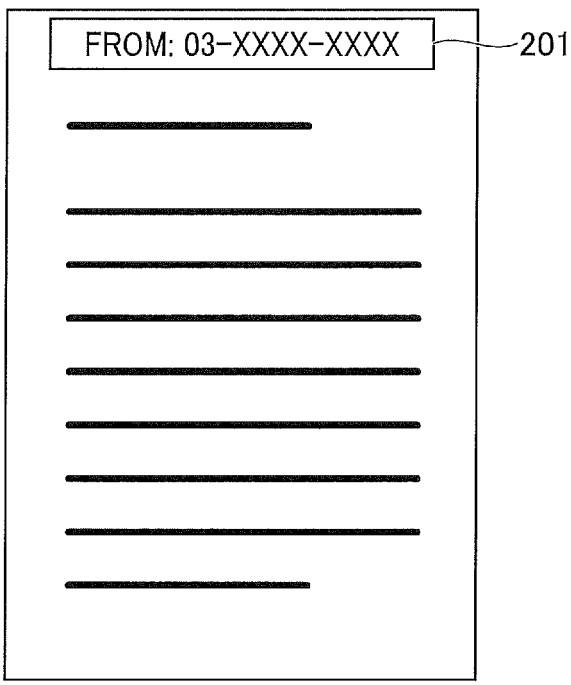
FIG. 8A to FIG. 8C (FIG. 8) are the diagrams each illustrating an example of the first page of the facsimile printed by the electronic device in step S8 of FIG. 6, according to the one of the embodiments of the disclosure.
Figure 8B:
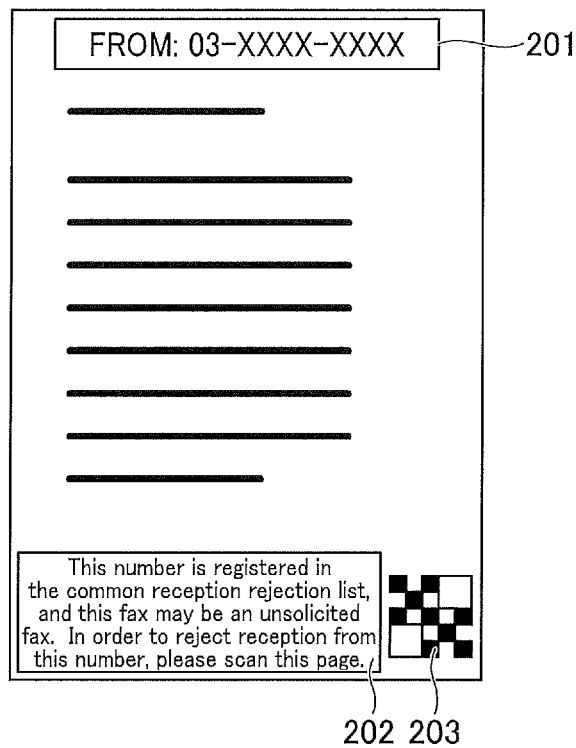
Figure 8C:
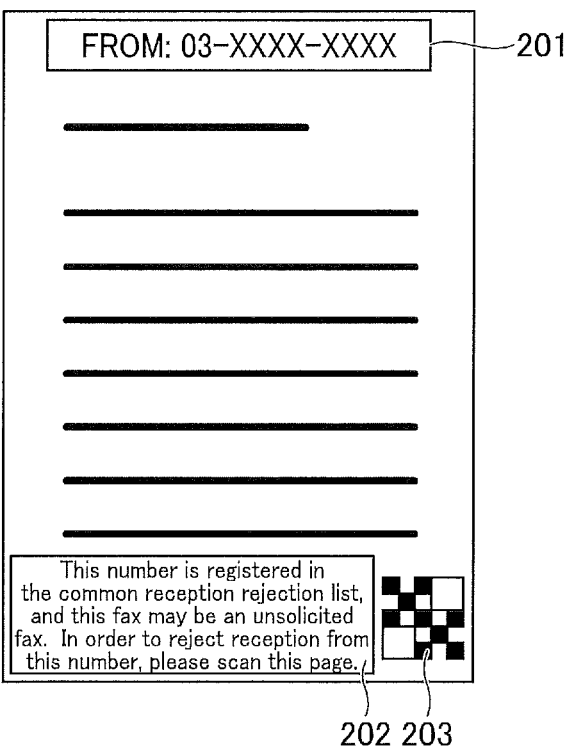

Subsequently, the information adding unit 37 adds a message and the image code A to the first page of the facsimile (S8). For example, the message to be added by the information adding unit 37 indicates that the transmission source of the facsimile is determined to be a transmission source that is to be rejected, such as a message of "This number is registered in the common reception rejection list, and this fax may be an unsolicited fax." For example, the information adding unit 37 adds, to the image data of the first page, an image code including the identification information of the transmission source, and the image code is a type A indicating the transmission source is already registered in the common reception rejection list. FIG. 8A to FIG. 8C (FIG. 8) are diagrams each illustrating an example of image data to which the information is added, according to present embodiment. An output unit 34 prints the first page of the facsimile to which the information is added.

When the determination in step S5 is NO, since the transmission source is not registered (is unregistered) in the reception permission list, the reception rejection list, and the common reception rejection list, the communication control unit 35 receives the entire facsimile (S10). That is, when the determination indicates that reception of the facsimile from the transmission source is accepted based on the common reception rejection list, the communication control unit 35 receives the entire facsimile.

Figure 9A:
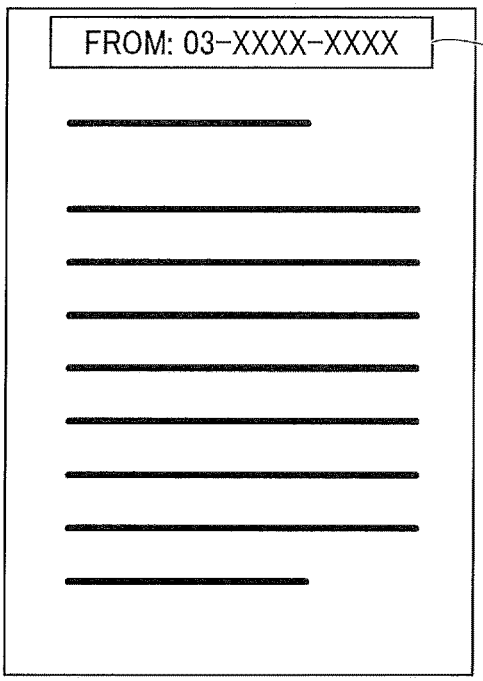
FIG. 9A to FIG. 9C (FIG. 9) are the diagrams each illustrating an example of the first page of the facsimile printed by the electronic device in step S11 of FIG. 10, according to the one of the embodiments of the disclosure.
Figure 9B:
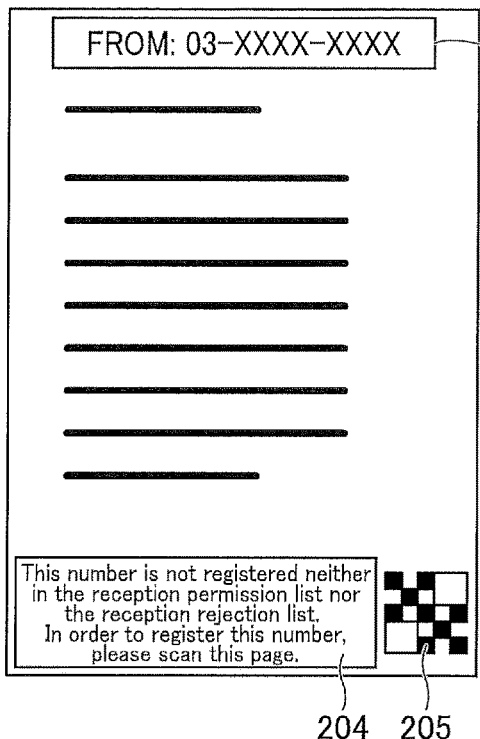
Figure 9C:
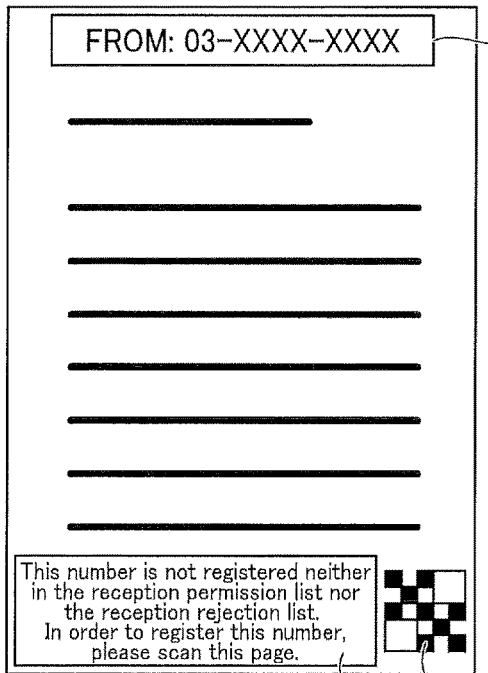

Subsequently, the information adding unit 37 adds the message and the image code B to the first page of the facsimile (S11). For example, the message to be added by the information adding unit 37 indicates that reception of a facsimile from the transmission source is determined not to be permitted neither rejected. This means that the transmission source of the facsimile is determined to apply none of one from which the facsimile is to be rejected and one from which the facsimile is to be accepted. The message is, for example, "This number is not registered neither in the reception permission list nor the reception rejection list. In order to register this number, please scan this page." For example, the information adding unit 37 adds, to the image data of the first page, an image code including the identification information of the transmission source, and the image code is a type B indicating the transmission source is not registered in the common reception rejection list. FIG. 9A to FIG. 9C (FIG. 9) are diagrams each illustrating an example of image data to which the information is added, according to present embodiment.

As described above, the electronic device 30 rejects reception of the facsimile, prints a part of the facsimile, or performs reception and printing of the entire facsimile according to registration of the transmission source in relation to the reception rejection list, the reception permission list, and the common reception rejection list. When printing a part of the facsimile, the electronic device 30 prints an image code used by the user to register the identification information of the transmission source in the list.

Example of Facsimile of which One Page is Printed:

FIG. 8A to FIG. 8C (FIG. 8) are the diagrams each illustrating an example of the first page of the facsimile printed by the electronic device 30 in step S8. FIG. 8A is a diagram illustrating an image before the information is added, and FIG. 8B and FIG. 8C are diagrams each illustrating an image after the information is added in step S8.

The image data illustrated in FIG. 8B includes identification information of transmission source 201, a message 202 that is added to a blank space generated when the image data is reduced by the information adding unit 37, and an image code 203. The reduction allows the user to check the entire first page of the facsimile.

The message 202 is, for example, "This number is registered in the common reception rejection list, and this fax may be an unsolicited fax. In order to reject the facsimiles from this number, please scan this page." The user checks the identification information of transmission source 201, the message 202, and the first page of the facsimile, and determines whether to reject the reception of the facsimiles from the transmission source with the electronic device 30. This page is scanned when the user desires to reject the facsimiles from the transmission source.

When scanning the first page, the electronic device 30 determines the type of the image code 203 and displays a button for registering the identification information of the transmission source in the reception rejection list or the reception permission list.

The methods of adding the message 202 and the image code 203 used for the image data illustrated in FIG. 8C and used for the image data illustrated in FIG. 8B are different from each other. In FIG. 8c, the information adding unit 37 overwrites the message 202 and the image code 203 on the lower part of the image data without reducing the image data. The image overwritten on the lower part of the image data facilitates the user to check the content of the first page of the facsimile.

The method of adding the message 202 and the image code 203 is not limited thereto, as long as the message 202 is readable by the user and the image code 203 is readable by the electronic device 30 from the facsimile image data.

FIG. 9A to FIG. 9C (FIG. 9) are the diagrams each illustrating an example of the first page of the facsimile printed by the electronic device 30 in step S11. FIG. 9A is a diagram illustrating an image before the information is added, and FIG. 9B and FIG. 9C are diagrams each illustrating an image after the information is added in step S11. FIG. 9C is substantially the same as FIG. 8C except for the content of the message.

The image data illustrated in FIG. 9B includes the identification information of transmission source 201, a message 204 that is added to a blank space generated when the image data is reduced by the information adding unit 37, and an image code 205. The reduction allows the user to check the entire first page of the facsimile.

The message 204 is, for example, "This number is not registered neither in the reception permission list nor the reception rejection list. In order to register this number, please scan this page." The user checks the identification information of transmission source 201, the message 204, and the first page of the facsimile, and determines whether to reject or permit the reception of the facsimiles from the transmission source. This page is scanned when the user desires to reject or permit the reception of the facsimiles from the transmission source with the electronic device 30 or the shared server 50.

When scanning the first page, the electronic device 30 determines the type of the image code 205 and displays a button for registering the identification information of the transmission source in the reception rejection list, the reception permission list, or the common reception rejection list.

Figure 10B:
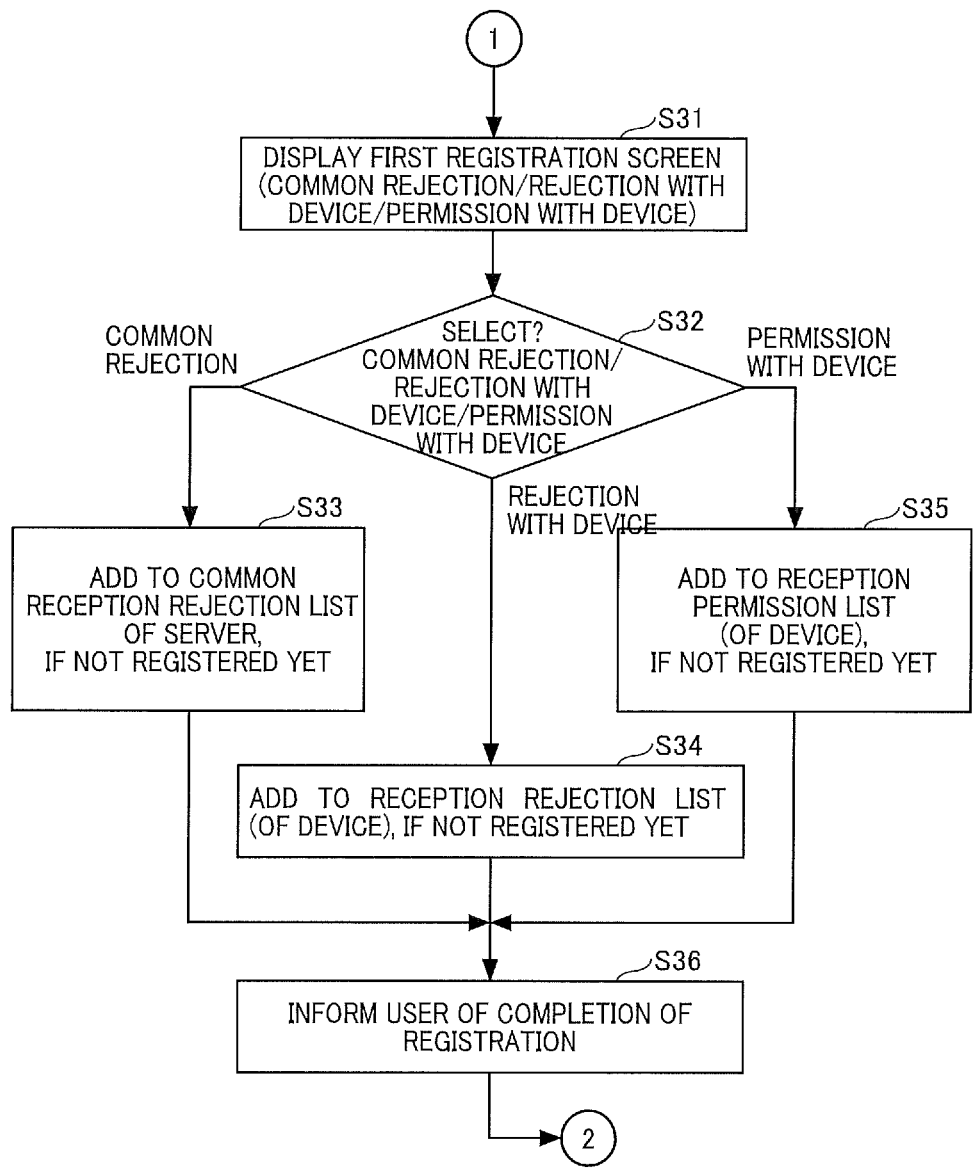

Operation in Scanning Image Code:

With reference to FIG. 10A and FIG. 10B (FIG. 10), a process when the electronic device 30 reads a facsimile to which an image code is added will be described. FIG. 10A and FIG. 10B (FIG. 10) are flowchart illustrating an example of a process in which the electronic device 30 reads an image code and registers identification information of a transmission source in the reception permission list, the reception rejection list, or the common reception rejection list, according to the present embodiment. The process illustrated in FIG. 10A and FIG. 10B starts when the electronic device 30 reads a document.

The reading unit 36 reads the document and detects the image code (S21). For example, in case of a QR CODE (Registered Trademark), the reading unit 36 searches the image data for three position detection patterns (finder patterns) arranged at three corners. In the position detection pattern of the QR CODE (Registered Trademark), a ratio of the white cell to the black cell is 1:1:3:1:1 from any of the horizontal direction, the vertical direction, and the oblique direction. Accordingly, when the reading unit 36 detects the three position detection patterns, the position of the code image is specified. When the reading unit 36 detects the image code, the monochrome pattern is decoded by a predetermined method, and the identification information of the transmission source and the type of the image code are obtained.

The registration control unit 38 determines whether the image code related to fax reception control has been read or not (S22). The image code includes arbitrary identification information indicating service content, and the registration control unit 38 determines whether the image code is related to fax reception control based on the identification information.

When the determination of step S22 is NO, the registration control unit 38 displays on the control panel, for example, a message indicating that the image code is invalid (S30).

When the determination in step S22 is YES, the registration control unit 38 determines whether the image code is the image code B or not (S23).

When the determination in step S23 is NO, the registration control unit 38 determines whether the image code is the image code A or not (S24).

When the determination in step S24 is NO, this indicates that the electronic device 30 has read an image code that is neither the image code A nor the image code B. Accordingly, the registration control unit 38 displays on the control panel, for example, a message indicating that the image code is invalid (S30).

In a case where the determination of step S24 is YES, since the electronic device 30 has read the image code A, the registration control unit 38 displays a first registration screen for registering the transmission source in the reception permission list of the device or the reception rejection list of the device on the control panel (S25). That is, the image code A is added to the facsimile when the transmission source is not registered in either the reception permission list or the reception rejection list and is registered in the common reception rejection list. Accordingly, the registration control unit 38 supports registration of the transmission source in the reception permission list or the reception rejection list.

Figure 11:
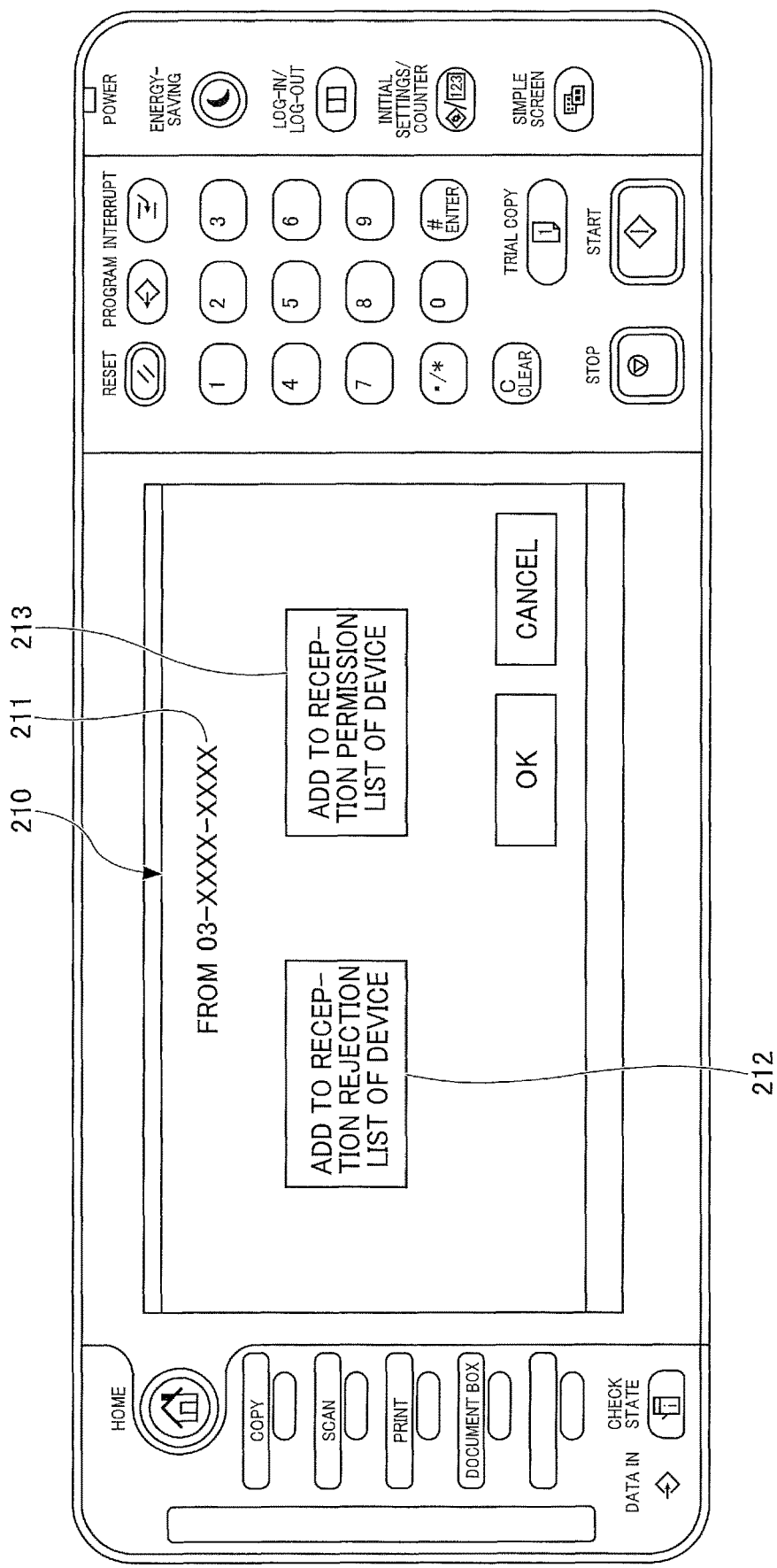
FIG. 11 is a diagram illustrating an example of a first registration screen, according to the one of the embodiments of the disclosure.

FIG. 11 is a diagram illustrating an example of the first registration screen according to the present embodiment.

On the first registration screen, the user selects whether to register the transmission source in the reception permission list or the reception rejection list (S26). The operation reception unit 33 receives a user operation, which is an operation of selection performed by a user.

When the reception rejection list of the device (the rejection with the device) is selected, the registration control unit 38 registers the identification information of the transmission source decoded from the image code A in the reception rejection list (S27). When the identification information of the transmission source decoded from the image code A is already registered in the reception permission list, the registration control unit 38 deletes the identification information from the reception permission list. This is to avoid a contradictory situation in which the same transmission source is registered in two different lists in the device.

When the reception permission list of the device (the permission with the device) is selected, the registration control unit 38 registers the identification information of the transmission source decoded from the image code A in the reception permission list (S28). When the identification information of the transmission source decoded from the image code A is already registered in the reception rejection list, the registration control unit 38 deletes the identification information from the reception rejection list.

The registration control unit 38 displays, on the control panel 940 via the display control unit 32, that the addition to the reception rejection list or the addition to the reception permission list has been completed (S29).

Figure 12:
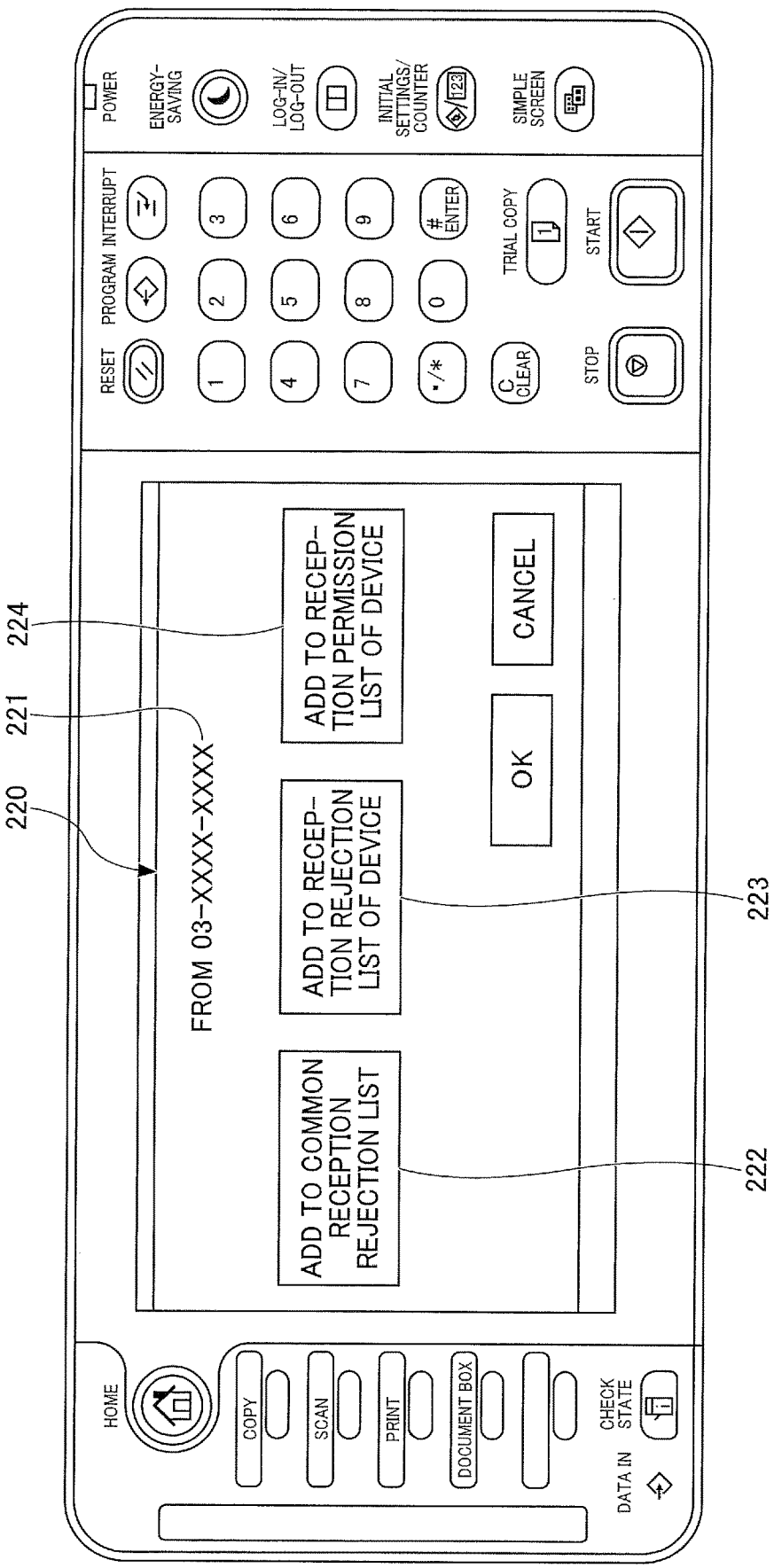
FIG. 12 is a diagram illustrating an example of a second registration screen, according to the one of the embodiments of the disclosure.

When the determination in step S23 is YES, namely, when the electronic device 30 has read the image code B, the registration control unit 38 displays, on the control panel, a second registration screen for registering the transmission source in the reception permission list of the device, the reception rejection list of the device, or the common reception rejection list (S31). That is, the image code B is added to the facsimile when the transmission source is not registered (is unregistered) in any of the reception permission list, the reception rejection list, and the common reception rejection list. Accordingly, the registration control unit 38 supports registration of the transmission source in the reception permission list, the reception rejection list, or the common reception rejection list. FIG. 12 is a diagram illustrating an example of the second registration screen according to the present embodiment.

On the second registration screen, the user selects whether to register the transmission source in the reception permission list, the reception rejection list, or the common reception rejection list (S32). The operation reception unit 33 receives a user operation, which is an operation of selection performed by a user.

When the common reception rejection list is selected, the registration control unit 38 requests the shared server 50 to register the identification information of the transmission source decoded from the image code B in the common reception rejection list via the communication unit 31 (S33). That is, the request is performed by transmitting a transmission source registration request to the shared server 50. The communication unit 51 of the shared server 50 receives the transmission source registration request and registers the identification information of the transmission source in the common reception rejection list.

When the reception rejection list of the device (the rejection with the device) is selected, the registration control unit 38 registers the identification information of the transmission source decoded from the image code B in the reception rejection list (S34). When the identification information of the transmission source decoded from the image code B is already registered in the reception permission list, the registration control unit 38 deletes the identification information from the reception permission list.

When the reception permission list of the device (the permission with the device) is selected, the registration control unit 38 registers the identification information of the transmission source decoded from the image code B in the reception permission list (S35). When the identification information of the transmission source decoded from the image code B is already registered in the reception rejection list, the registration control unit 38 deletes the identification information from the reception rejection list.

The registration control unit 38 displays, on the control panel 940 via the display control unit 32, that the addition to the common reception rejection list, addition to the reception rejection list, or the addition to the reception permission list has been completed (S36).

As described above, the identification information of the transmission source is included in the image code, and this allows the user to register the transmission source in each of the lists by a simple operation. For example, the user does not manually input the facsimile number, and this prevents an occurrence of input error.

First Registration Screen and Second Registration Screen:

FIG. 11 is a diagram illustrating an example of the first registration screen 210 according to the present embodiment. The first registration screen 210 includes identification information of transmission source 211, a reception rejection list registration button 212, and a reception permission list registration button 213. The identification information of transmission source 211 indicates a transmission source that is added to the first page of the facsimile by the information adding unit 37 and decoded by the reading unit 36. The reception rejection list registration button 212 is a button for registering the identification information of the transmission source in the reception rejection list of the device. The reception permission list registration button 213 is a button for registering the identification information of the transmission source in the reception permission list of the device.

FIG. 12 is a diagram illustrating an example of the second registration screen 220 according to the present embodiment. The second registration screen 220 includes identification information of transmission source 221, a common reception rejection list registration button 222, a reception rejection list registration button 223, and a reception permission list registration button 224. In the following description of FIG. 12, differences from FIG. 11 are described. The common reception rejection list registration button 222 is a button for registering the identification information of the transmission source in the common reception rejection list of the shared server 50.

The user can register the identification information of the transmission source in each list by selecting the corresponding button.

Process of Receiving All Pages:

In the present embodiment, as described in step S7 of FIG. 6, the electronic device 30 receives the first page. In this case, when the user checks the first page and determines to receive all pages, the user may request the transmission source to transmit the facsimile again. To cope with such a situation, the electronic device 30 may receive all pages and print the remaining pages (other pages than the first page) according to a user operation.

A description is given below a case where the electronic device 30 receives all pages, with reference to FIG. 6 and FIG. 10.

In step S7 of FIG. 6, the communication control unit 35 receives all pages of the facsimile.

In step S7 of FIG. 6, the output unit 34 prints the first page of the facsimile. The output unit 34 deletes the image data of the first page in the memory, and does not delete the other pages than the first page.

In step S26 of FIG. 10, when the user selects the reception rejection list of the device, the output unit 34 deletes the remaining pages. When the user selects the reception rejection list, this indicates the determination that the facsimile is not to be used.

When the user selects the reception permission list of the device, the output unit 34 prints the remaining pages. The output unit 34 deletes the data corresponding to the printed pages. When the user selects the reception permission list, this indicates the determination that the facsimile is to be used.

As described above, the electronic device 30 temporarily stores all pages, and all pages of the facsimile is printed depending on the user operation. Since the data corresponding to the printed facsimile is deleted, the memory is not compressed. In addition, the data corresponding to a part of the facsimile that is not printed is kept being stored, the electronic device 30 keeps the data of the facsimile.

In step S32 of FIG. 10, when the user selects the reception rejection list of the device, the output unit 34 deletes the remaining pages. When the user selects the reception rejection list, this indicates the determination that the facsimile is not to be used.

When the user selects the reception permission list of the device, the output unit 34 prints the remaining pages. The output unit 34 deletes the data corresponding to the printed pages. When the user selects the reception permission list, this indicates the determination that the facsimile is to be used.

When the user selects the common reception rejection list, the output unit 34 deletes the remaining pages. When the user selects the common reception rejection list, this indicates the determination that the facsimile is not to be used.

Setting of Receiving a Part or all of Pages:

The user may set whether the electronic device 30 receives a part of the pages or all of the pages.

FIG. 13 is a diagram illustrating an example of a setting screen 230 for setting partial reception or full page reception, according to the present embodiment. The setting screen 230 includes a message 231, such as for example "Do you receive all pages or a part the pages?", a radio button 232 associated with "Receive 1 page", and a radio button 233 associated with "Receive all pages". The radio button 232 is a button selected by the user to set that the electronic device 30 receives a single page. The radio button 233 is a button selected by the user to set that the electronic device 30 receives all pages.

As described above, the user may set whether the electronic device 30 receives a part of the pages or all pages.

As described above, the electronic device 30 according to the present embodiment does not unconditionally discard the facsimile (reject the reception of the facsimiles) from the transmission source registered in the common reception rejection list. The electronic device according to the present embodiment notifies the user of the probability of being an unsolicited facsimile because the transmission source is registered in the common reception rejection list, and inform a part of the received data. Accordingly, the electronic device 30 according to the present embodiment easily notifies the user of the probability of being an unsolicited facsimile that the user should reject to receive the facsimile. In addition, the user checks the part of the received data. This allows the user to determine whether the transmission source is really one to be rejected. Further, the transmission source of the unsolicited facsimile is shared in a specific group such as a company.

The electronic device 30 according to the present embodiment has the reception rejection list and the reception permission list, this allows the electronic device 30 to receive a facsimile from a transmission source to which the electronic device 30 does not transmit a facsimile.

In a conventional technique, an electronic device does not output, or print out, any received facsimiles. More specifically, even if a transmission source registered in a common reception rejection list shared by a plurality of electronic devices on a shared server is not recorded, or registered, in a contact list of the electronic device, the transmission source may be one from which the facsimiles are accepted by a user of the electronic device. That is, there may be a case in which the common reception rejection list of the shared server includes the transmission source from which the facsimiles are accepted by, for example, one or more of a plurality of users, companies, offices, or bases. When the transmission source from which the facsimiles are to be accepted is erroneously recorded, or registered in the common reception rejection list, the electronic device does not output any of the facsimile. There is no way for the user to determine whether the transmission source registered in the common reception rejection list is one from which the user desires to accept or reject facsimiles.

According to one or more embodiment, an electronic device that outputs at least a part of a facsimile is provided.

Variation:

The above-described embodiment is illustrative and does not limit the present disclosure. Thus, numerous additional modifications and variations are possible in light of the above teachings within the scope of the present disclosure. For example, elements and/or features of different illustrative embodiments may be combined with each other and/or substituted for each other within the scope of the present disclosure. Any one of the above-described operations may be performed in various other ways, for example, in an order different from the one described above.

For example, in the present embodiment, the user causes the electronic device 30 to read the image code to register the identification information of the transmission source in the common reception rejection list, the reception rejection list, or the reception permission list. In some embodiments, the user may manually register the identification information from a list of incoming call history.

The configuration example of FIG. 5 in the above-described embodiment is divided according to the main functions in order to facilitate understanding of the processes of the electronic device 30. No limitation is intended by how the processes are divided or by the names of the processes. A process implemented by the electronic device 30 may be divided to a larger number of processes depending on the content of process. Further, one process can be divided to include a larger number of processes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The devices (apparatuses) and the like described in the examples are merely an illustration of one of several computing environments for implementing the embodiments disclosed herein.

Note that the electronic device 30 is not limited to an image forming device as long as the apparatus has a communication function. The electronic device 30 includes, for example, an output device such as a projector (PJ), an electronic whiteboard, a digital signage, a head up display (HUD) device, and an industrial machine, an imaging device, a sound collecting device, a medical device, a network home appliance, an automobile (connected car), a notebook PC, a mobile phone, a smartphone, a tablet terminal, a game console, a personal digital assistant (PDA), a digital camera, a wearable PC or a desktop PC.

The invention claimed is:

1. An electronic device, comprising:
circuitry configured to
determine, in a case that a transmission source of a facsimile is registered neither in a reception permission list of the electronic device nor in a reception rejection list of the electronic device, whether to reject the facsimile being transmitted from the transmission source based on a common transmission source list, the common transmission source list being shared by a plurality of electronic devices including the electronic device;
output a part of the facsimile in response to determining that the transmission source is one from which the facsimile is to be rejected, based on the common transmission source list, and
add, to the part of the facsimile, a first image code that stores identification information of the transmission source of the facsimile and information that the transmission source of the facsimile is determined as the one from which the facsimile is to be rejected,
wherein the circuitry outputs the part of the facsimile to which the first image code is added.

2. The electronic device of claim 1,
wherein, in response to deteiniining that the transmission source of the facsimile is not one from which the facsimile is to be rejected based on the common transmission source list,
the circuitry further:
adds, to the facsimile, a second image code that stores the identification information of the transmission source of the facsimile and information that the transmission source of the facsimile is not determined as the one from which the facsimile is to be rejected; and
outputs all of the facsimile to which the second image code is added.

3. The electronic device of claim 2,
the circuitry further:
adds, to the facsimile, a message indicating that the transmission source of the facsimile is not determined as the one from which the facsimile is to be rejected; and
outputs the facsimile to which the message is added.

4. The electronic device of claim 2,
wherein the circuitry further:
reads the facsimile to which the second image code is added after outputting the facsimile;
causes a display to display a registration screen for receiving a user operation indicating one of a first registration instruction, a second registration instruction, and a third registration instruction, in response to reading the part of the facsimile to which the second image code is added, the first registration instruction being an instruction to register the transmission source in the reception permission list of the electronic device, the second registration instruction being an instruction to register the transmission source in the reception rejection list of the electronic device, the third registration instruction being an instruction to register the transmission source in the common transmission source list; and
registers, in response to receiving the user operation, the identification information of the transmission source stored in the second image code in one of the reception permission list, the reception rejection list, and the common transmission source list according to the user operation.

5. The electronic device of claim 1,
wherein the circuitry further adds, to the part of the facsimile, a message indicating that the transmission source of the facsimile is determined as the one from which the facsimile is to be rejected; and
outputs the part of the facsimile to which the message is added.

6. The electronic device of claim 1,
wherein the circuitry further:
reads the part of the facsimile to which the first image code is added after outputting the part of the facsimile;
causes a display to display a registration screen for receiving a user operation indicating one of a first registration instruction and a second registration instruction, in response to reading the part of the facsimile to which the first image code is added, the first registration instruction being an instruction to register the transmission source in the reception permission list of the electronic device, the second registration instruction being an instruction to register the transmission source in the reception rejection list of the electronic device; and
registers, in response to receiving the user operation, the identification information of the transmission source stored in the first image code in one of the reception permission list and the reception rejection list according to the user operation.

7. The electronic device of claim 6,
wherein the circuitry further:
receives all of the facsimile in response to determining that the transmission source is one from which the facsimile is to be rejected based on the common transmission source list;
outputs the part of the facsimile; and
outputs a remaining part of the facsimile in response to receiving the first registration instruction.

8. The electronic device of claim 1,
wherein the circuitry further disconnects from a communication with the transmission source after receiving the part of the facsimile, in response to determining that the transmission source is one from which the facsimile is to be rejected based on the common transmission source list.

9. A facsimile communication system, comprising:
the electronic device of claim 1; and
a shared server including additional circuitry configured to
store, in a memory, the common transmission source list, transmit, to the electronic device, information indicating whether the transmission source is the one from which the facsimile is to be rejected, the information being obtained by determining based on the identification information of the transmission source and the common transmission source list, the identification information of the transmission source being transmitted from the electronic device.

10. A non-transitory recording medium storing a plurality of instructions which, when executed by one or more processors, causes the processors to perform a method, the method comprising:

outputting a part of a facsimile being transmitted from a transmission source in response to determining that the transmission source of the facsimile is registered neither in a reception permission list of an electronic device nor in a reception rejection list of the electronic device and that the transmission source is one from which the facsimile is to be rejected, based on a common transmission source list, the common transmission source list being shared by a plurality of electronic devices, wherein a first image code is added to the part of the facsimile, the first image code storing identification information of the transmission source of the facsimile and information that the transmission source of the facsimile is determined as the one from which the facsimile is to be rejected.

11. A facsimile receiving method, comprising:

outputting a part of a facsimile being transmitted from a transmission source in response to determining that the transmission source of the facsimile is registered neither in a reception permission list of an electronic device nor in a reception rejection list of the electronic device and that the transmission source is one from which the facsimile is to be rejected based on a common transmission source list, the common transmission source list being shared by a plurality of electronic devices, wherein a first image code is added to the part of the facsimile, the first image code storing identification information of the transmission source of the facsimile and information that the transmission source of the facsimile is determined as the one from which the facsimile is to be rejected.

* * * * *